US006178403B1

(12) United States Patent
Detlef

(10) Patent No.: US 6,178,403 B1
(45) Date of Patent: Jan. 23, 2001

(54) DISTRIBUTED VOICE CAPTURE AND RECOGNITION SYSTEM

(75) Inventor: Michael J. Detlef, Vancouver, WA (US)

(73) Assignee: Sharp Laboratories of America, Inc., Portland, OR (US)

(*) Notice: Under 35 U.S.C. 154(b), the term of this patent shall be extended for 0 days.

(21) Appl. No.: 09/212,544

(22) Filed: Dec. 16, 1998

(51) Int. Cl.[7] .......................... G10L 15/22; G10L 21/06; G11B 7/26
(52) U.S. Cl. ...................... 704/270; 704/201; 704/278; 369/273
(58) Field of Search ............................ 704/270, 200, 704/235, 278, 272, 7

(56) References Cited

U.S. PATENT DOCUMENTS

| 5,396,497 | 3/1995 | Veltman ........................ 370/100.1 |
| 5,519,606 | 5/1996 | Frid-Nielsen et al. ............ 364/401 |
| 5,528,636 | 6/1996 | Sevenhans et al. .............. 375/371 |
| 5,553,222 | 9/1996 | Milne et al. ..................... 395/154 |
| 5,602,536 | 2/1997 | Henderson et al. ............ 340/825.31 |
| 5,623,483 | 4/1997 | Agrawal et al. ................. 370/253 |
| 5,655,144 | 8/1997 | Milne et al. ..................... 395/807 |
| 5,682,524 | 10/1997 | Freund et al. .................. 395/605 |
| 5,701,423 | 12/1997 | Crozier ........................... 395/335 |

OTHER PUBLICATIONS

"Dragon Systems, Inc Press Releases", Laz Vegas, Nov. 1998 (and supporting materials).*
"The Parrot™ for the Oalm Computing® Platform" advertisements, dated from Dec. 1998.*
"Tucows" Internet application program library listings, dated from Jan. 1995 (Memovoc–2) to present.*

* cited by examiner

Primary Examiner—Richemond Dorr
Assistant Examiner—Daniel A. Nolan
(74) Attorney, Agent, or Firm—Chernoff, Vilhauer, McClung & Stenzel, LLP

(57) ABSTRACT

A hand-held data acquisition device includes a display presenting at least one of an address book, a date book, a memo pad, a to-do list, a contact manager, an expense tracker, an e-mail client, and a project manager, at least one of which contains multiple data items. An input device is operatively connected to the device is suitable to receive voice data from the user. The data acquisition device stores the voice data and associates the voice data with at least one of the data items.

28 Claims, 6 Drawing Sheets

DISTRIBUTED VOICE CAPTURE AND RECOGNITION SYSTEM

BACKGROUND OF THE INVENTION

The present invention relates to a distributed voice capture and recognition system.

Laptop computers were developed, at least in part, to permit users to perform computing at locations remote from their desktop computers. Such locations include hotels, airports, and business meetings. Laptops normally include scheduler and address book software which allows users to manage such information, while maintaining the capability of synchronizing such information with others and their desktop computer. Typically, data entry on laptops is performed using a keyboard or voice recognition software. Unfortunately, laptops are bulky and weigh several pounds which limits their portability.

Market demands for greater portability than that achievable with laptops have created a new class of electronic devices, known generally as personal data appliances (PDAs). PDAs are small hand-held electronic devices that include many features, such as an address book, a calculator, a date book, a memo pad, and a to-do list.

US Robotics has developed a hand held PDA, sold under the trademark Palm Pilot, having a touch screen display that includes handwriting recognition. The handwriting recognition is based on using a stylus (plastic stick) to draw each character on a portion of the display. The use of handwriting recognition requires the user to learn a scripting character set. Unfortunately, handwriting recognition lacks the accuracy and speed of a traditional computer keyboard. Also, entering letters using the stylus is especially difficult to perform in moving vehicles. In addition, PDA's lack the computing resources necessary to effectively perform speech recognition. Nonetheless, users of PDA's have demonstrated a willingness to perform data entry (creation of new appointments or contacts) on portable devices, such as PDAs, using these traditional data entry techniques (handwriting recognition, small keypad text entry, etc.) in spite of the cumbersome nature of these entry methods.

The application of database synchronization technology to the PDA has dramatically reduced the amount of data which must be entered directly into the PDA. Specifically, corporate phone lists can be automatically "synchronized" to the target PDA as can schedule information from the user's desktop time management software. Given this situation, a class of mainstream users who are unwilling to tolerate the peculiarities of PDA data entry are still able to benefit from the PDA and chose to simply scribble notes which are carried until they can be entered into a host personal computer which will then be used to synchronize with the PDA.

There exists credit card sized PDAs that do not even support on-device data entry. All updates to the credit card sized PDA must be performed on a personal computer which is later synchronized to the credit card sized PDA. The advantage of such a device is that it eliminates the computing resources necessary to support PDA-based data entry, and the size and cost of the resulting PDA can be dramatically reduced. Unfortunately, without the ability to update information on the PDA while away from the personal computer, the user is forced to carry handwritten notes which outline changes to the stored schedule. The longer the user waits between synchronization sessions, the less relevant the stored PDA data will likely become.

What is desired, therefore, is an input system for a hand-held electronic device that is convenient for users.

BRIEF SUMMARY OF THE INVENTION

The present invention overcomes the aforementioned drawbacks of the prior art by a hand-held data acquisition device that includes a display presenting at least one of an address book, a date book, a memo pad, a to-do list, a contact manager, an expense tracker, an e-mail client, and a project manager, at least one of which contains multiple data items. An input device is operatively connected to the device is suitable to receive voice data from the user. The data acquisition device stores the voice data and associates the voice data with at least one of the data items.

The association of the voice sample with the data object (s) is an easy data entry technique requiring no textual entry for user of the device. The recording and retrieval of the voice sample alleviates the need for the user to use a stylus and the limitations of handwriting recognition to enter data into the device. In this manner, those users who are unwilling to tolerate the peculiarities of held-held device data entry are still able to more fully benefit from the hand-held device.

In the preferred embodiment the voice data is synchronized with a host system which may use voice recognition software to interpret the voice data. The textual representation of the voice data is then re-synchronized with the hand-held device to supplement or replace the voice samples. This allows for easier data entry and/or speech recognition capability, and permits the conversion of voice samples to textual information. In this manner, the hand-held device does not need to include substantially more computing resources because acquiring and storing voice samples is a relatively non-computationally intensive task.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

The present inventor came to the realization that hand held data devices, generally referred to herein as information appliances, include sufficient computing resources to facilitate the acquisition, storage, and retrieval of voice samples. Such information appliances include, for example, personal data assistants (PDAs), digital phones, and other hand held electronic devices. Further, the present inventor came to the realization that information appliances are suitable for associating the stored speech samples with other data elements stored within the information appliance.

Figure 2:
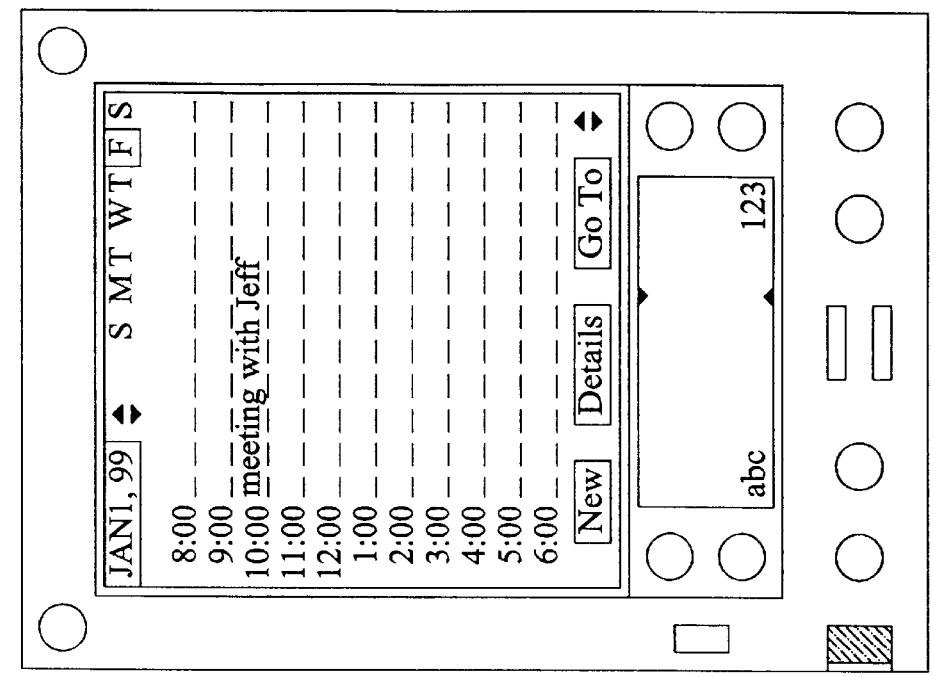
FIG. 2 is an illustration of a daily schedule for the information appliance of FIG. 1.
Figure 1:
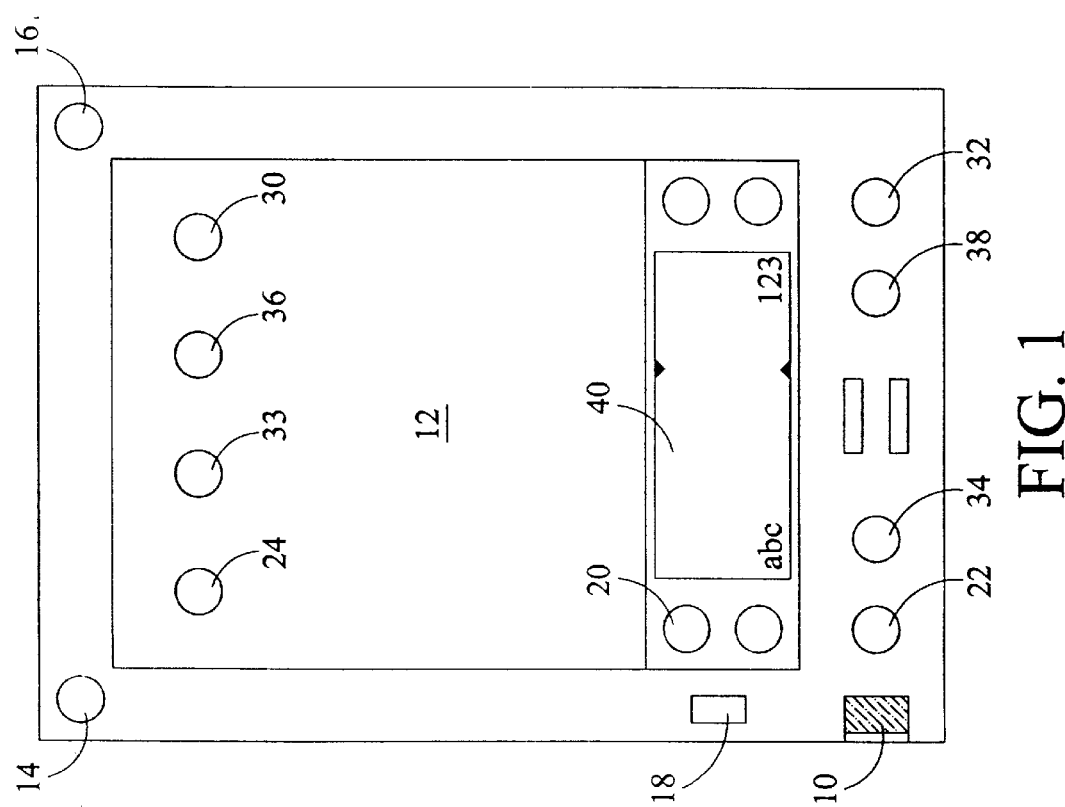
FIG. 1 is an exemplary embodiment of an information appliance of the present invention.
Figure 4:
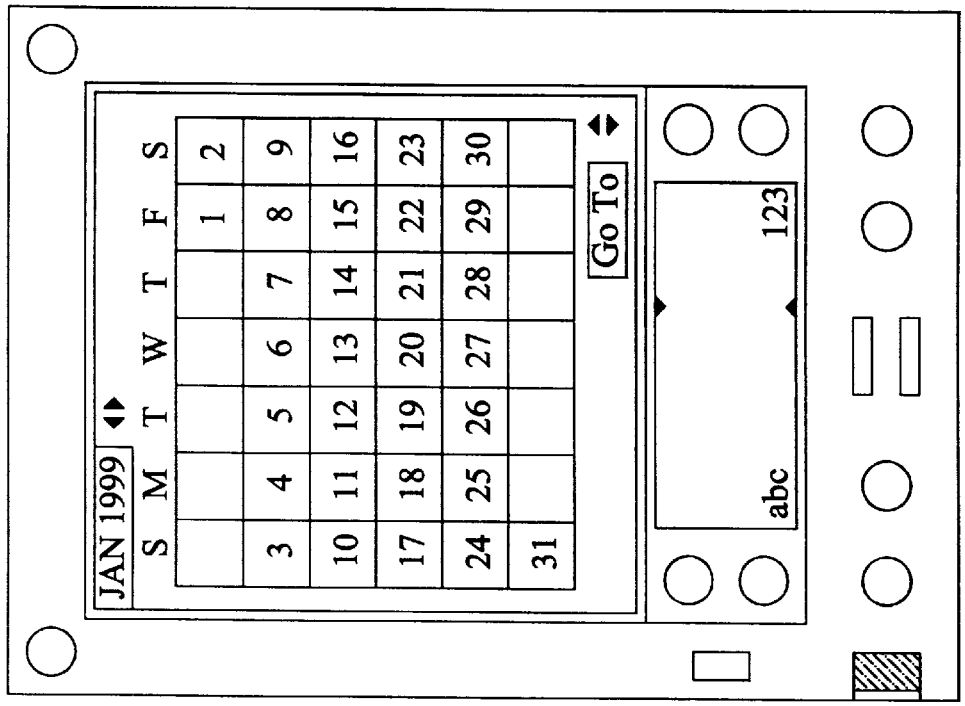
FIG. 4 is an illustration of a monthly schedule for the information appliance of FIG. 1.
Figure 3:
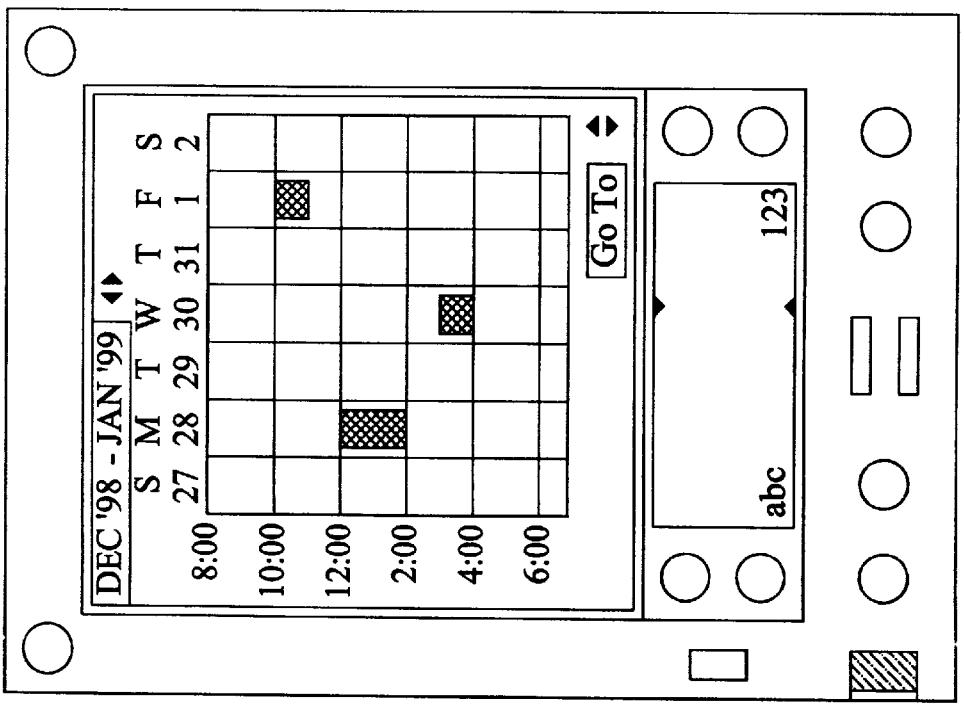
FIG. 3 is an illustration of a weekly schedule for the information appliance of FIG. 1.
Figure 6:
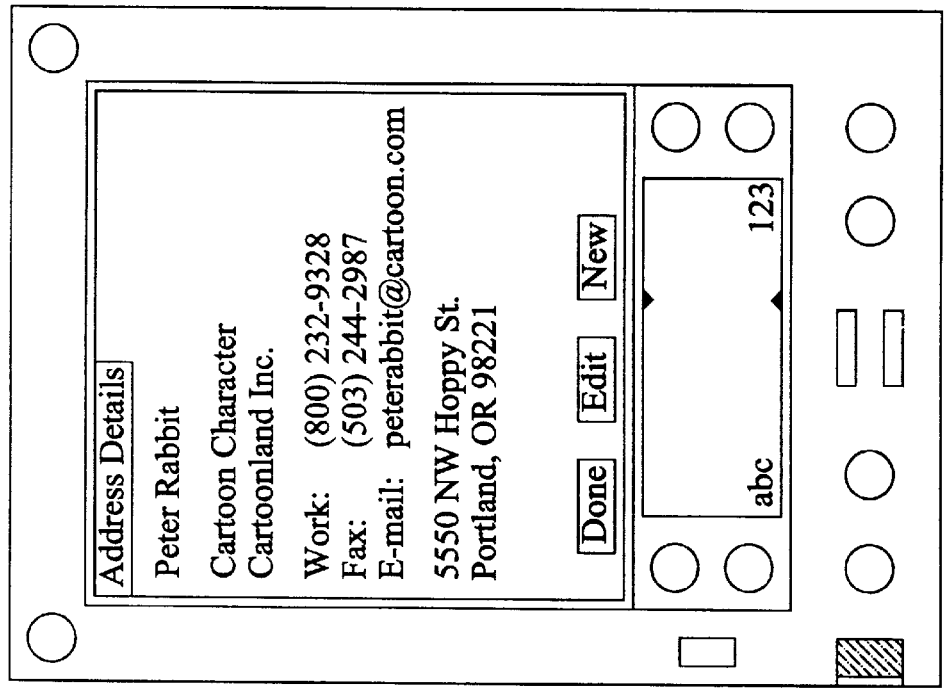
FIG. 6 is an illustration of a detailed information for each address for the information appliance of FIG. 1.
Figure 5:
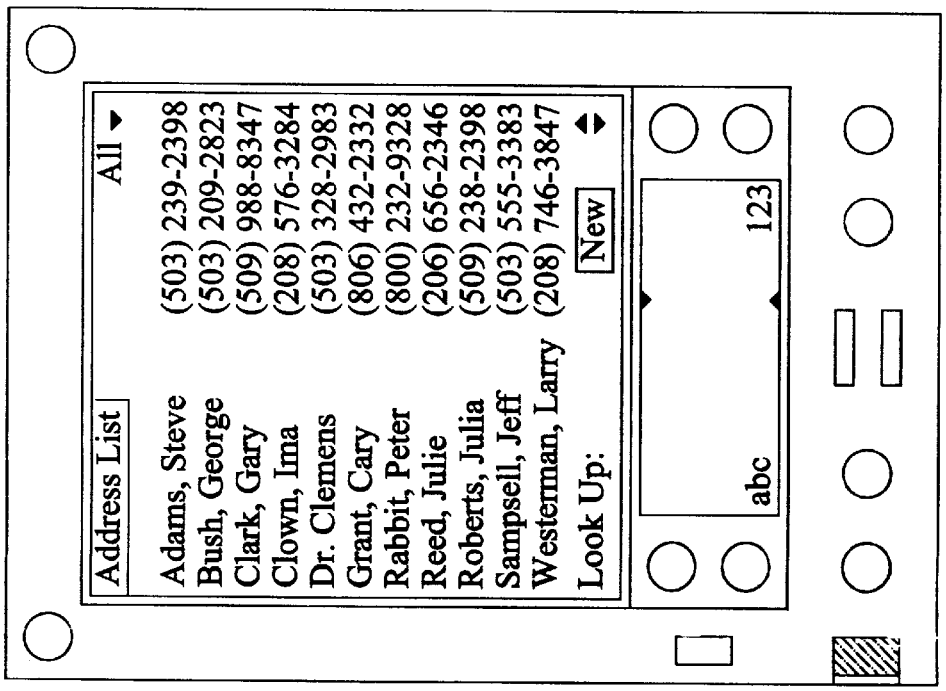
FIG. 5 is an illustration of a listing of addresses for the information appliance of FIG. 1.
Figure 8:
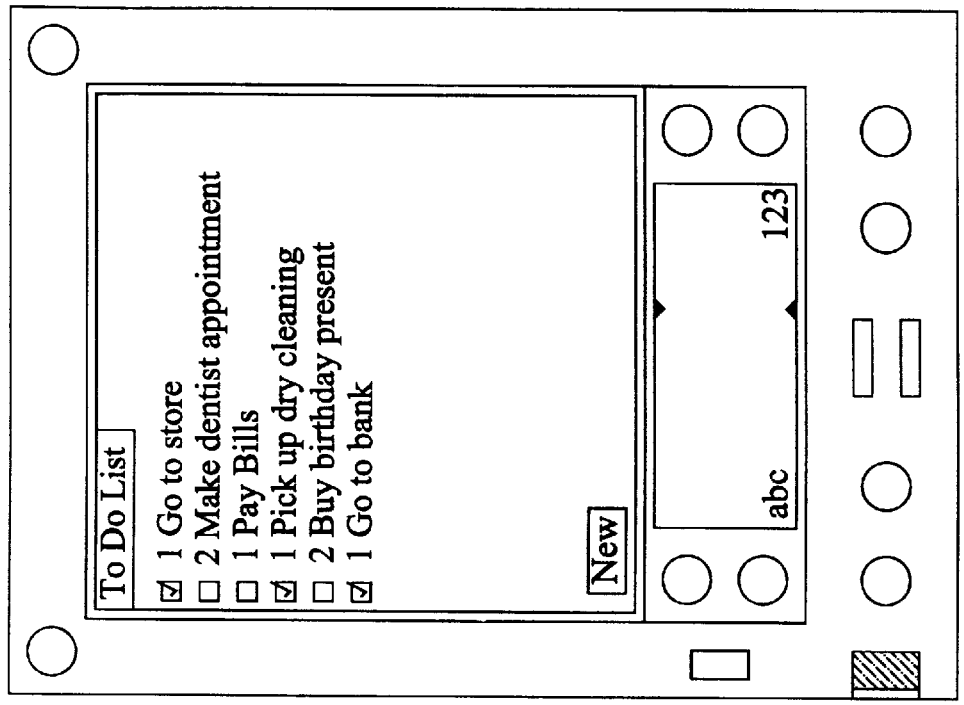
FIG. 8 is an illustration of a to-do list for the information appliance of FIG. 1.
Figure 7:
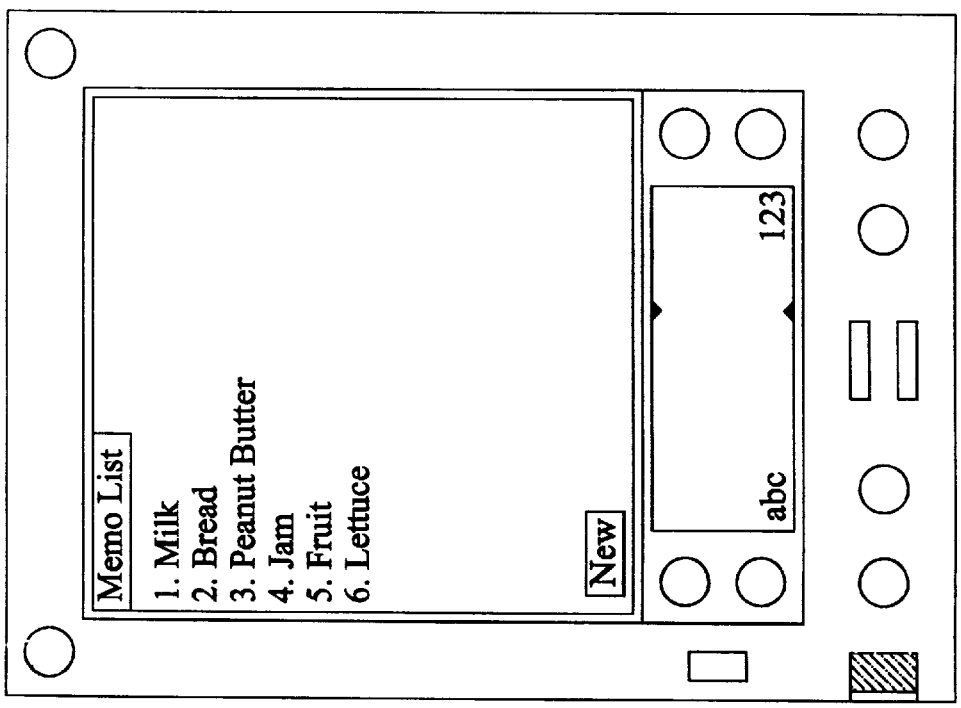
FIG. 7 is an illustration of a memo list for the information appliance of FIG. 1.

Referring to FIG. 1, an exemplary embodiment of an information appliance includes a power on/off button 10 and a touch-sensitive display 12. A microphone 14 and a speaker 16 are included within the information appliance. Alternatively, the microphone and speaker may be separate devices that are connected to the information appliance. A record button 18 is included on the information appliance. A date book is activated by touching the applications icon 20 followed by touching the date book icon 24 appearing on the display, or alternatively the date book button 22. The date book includes a daily schedule (FIG. 2), a weekly schedule (FIG. 3), and a monthly schedule (FIG. 4). Each entry in the date book is associated with a particular time period and day which is observable by the user. An address book is activated by touching the applications icon 20 followed by touching the address icon 30, or alternatively the address book button 32. The address book includes a listing of addresses (FIG. 5) and detailed information for each address (FIG. 6). A memo pad is activated by touching the applications icon 20 followed by touching the memo pad icon 33 or alternatively the memo pad button 34. The memo pad includes a list of memos entered by the user (FIG. 7). A to-do list is activated by touching the applications icon 20 followed by touching the to-do list icon 36, or alternatively the to-do list button 38. The to-do list includes a list of items with a priority, a category, and a date due (FIG. 8). A portion of the display 40 may be used for data entry with a stylus, if desired. One suitable information appliance is a US Robotics Palm Pilot as described in the Palm Pilot handbook, which is incorporated by reference herein. The information appliance may include additional functionality, such as a contact manager, an expense tracker, an e-mail client, and a project manager, as desired.

Figure 9:
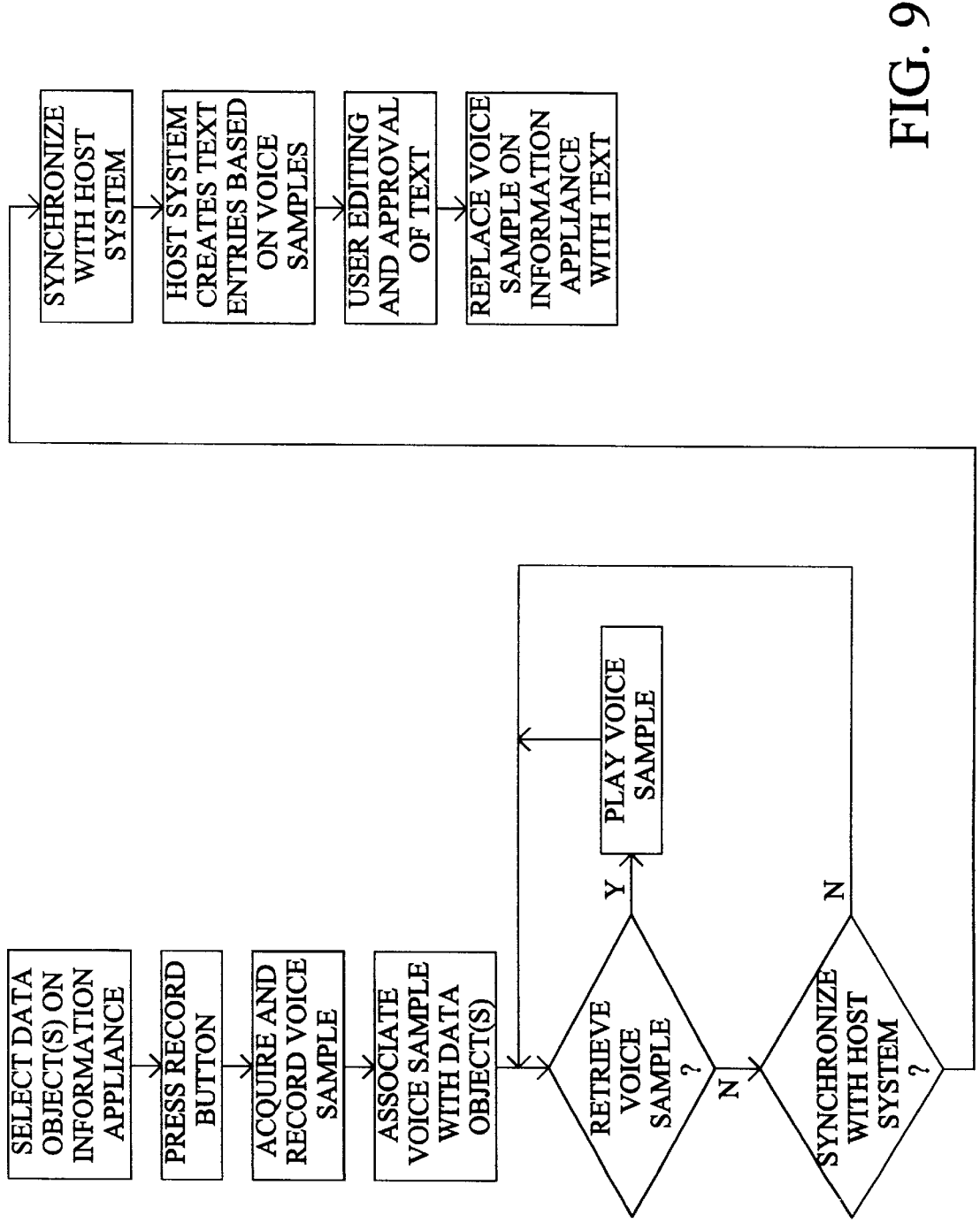
FIG. 9 is a flow chart of an exemplary embodiment of the use of the information appliance of FIG. 1.

Referring to "FIG. 1 in combination with FIG. 9", to use the information appliance the user selects one or more information appliance data objects (items), such as, for example, a person in the address book, an appointment in the date book, an item in the to-do list, and an item in the memo list. The user then initiates a voice recording session by pressing the record button 18 and speaking into the microphone 14 a memo to be attached to the data object(s). The information appliance acquires the voice and stores it as a voice sample, preferably in a digital format. The voice sample is associated with the data object(s). The user may listen to the voice sample through the speaker 16 by selecting the particular data objects with which the voice sample is associated. Subsequent viewing of the data object(s) will show the item as used or otherwise associated with a voice sample. The association of a voice sample with a data object(s) is an easy data entry technique requiring no textual entry for users of the information appliance (device). The information appliance, at this point, may replay the voice sample upon request but there is no associated textual representation. The recording and retrieval of the voice sample alleviates the need for the user to use a stylus and the limitations of handwriting recognition to enter data into the information appliance. In this manner, those users who are unwilling to tolerate the peculiarities of PDA data entry are still able to more fully benefit from the PDA.

In a further aspect of the present invention, the present inventor came to the realization that while the information appliance may lack the capability of interpreting the speech sample, the host system to which the information appliance is synchronized with may have speech recognition capability. When the user initiates a subsequent synchronization session after acquiring one or more speech samples associated with a data object(s), the speech samples are transmitted to the host system together with the remaining data. The host system process the voice samples to create a text-based representation. The user then edits and/or approves the text based representation. Alternatively, the host system may present the sampled speech to the user and allow manual entry of textual data representative of the sampled speech. The host system then synchronizes with the information appliance to replace the voice samples within the information appliance with the textual representation. As a result, the converted textual entry becomes indistinguishable from a traditional text based entry. Alternatively, the speech samples may be supplemented with the textual representation.

The integration of voice samples (memos) obtained by the information appliance together with later synchronization with the host computer system, which typically allows for easier data entry and/or speech recognition capability, permits the conversion of voice samples to textual information. In this manner, the information appliance does not need to include substantially more computing resources because acquiring and storing voice samples is a relatively non-computationally intensive task.

Figure 10:
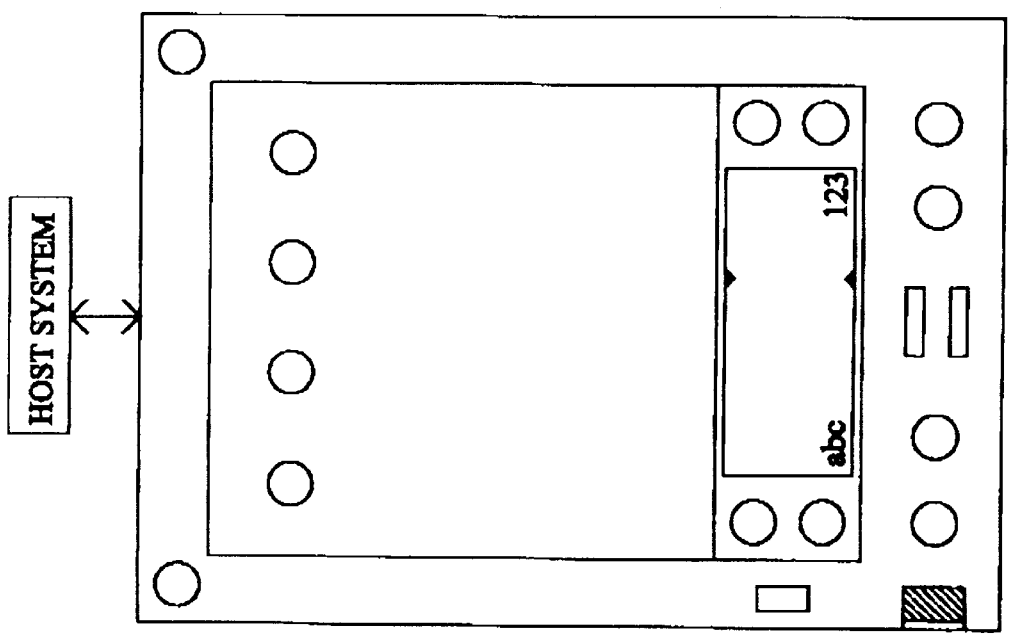
FIG. 10 is a block diagram of an information appliance system.

Referring to FIG. 10, a system includes the information appliance which is interconnected to the host system through any suitable communication link for the synchronization of data.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A hand-held data acquisition device suitable to be held in the hand of a user comprising:

(a) said hand-held data acquisition device including an integral display presenting at least one of an address book, a date book, a memo pad, a to-do list, a contact manager, an expense tracker, an e-mail client, and a project manager, at least one contains multiple data items;

(b) an input device operatively connected to said data acquisition device suitable to receive voice data from said user;

(c) said data acquisition device stores said voice data; and (d) said data acquisition device associates said voice data with at least one of said data items.

2. The device of claim 1 wherein said display presents said address book.

3. The device of claim 1 wherein said display presents said date book.

4. The device of claim 1 wherein said display presents said memo pad.

5. The device of claim 1 wherein said display presents said to-do list.

6. The device of claim 1 wherein said display presents said contact manager.

7. The device of claim 1 wherein said display presents at least one of said project manager, said expense tracker, and said e-mail client.

8. The device of claim 1 wherein said input device is a microphone.

9. The device of claim 1 wherein said input device is integral with said device.

10. The device of claim 1 further comprising:
   (a) a host computer system that receives said voice data; and
   (b) a converter that converts said voice data to a textual representation.

11. The device of claim 10 further comprising said device receiving said textual representation and associating said textual representation with said at least one of said data items on said device.

12. The device of claim 11 wherein said associating said textual representation deletes said voice data.

13. The device of claim 10 wherein said converter includes voice recognition software.

14. The device of claim 10 wherein said converter includes a keyboard.

15. A method of creating records comprising the steps of:
   (a) providing a portable data acquisition device suitable to be held in the hand of a user;
   (b) presenting to said user on said portable data acquisition device at least one of an address book, a memo pad, a to-do list, a contact manager, an expense tracker, an e-mail client, and a project manager, at least one contains multiple data items;
   (c) receiving vice data from said user by said data acquisition device;
   (d) storing said vice data within said data acquisition device; and
   (e) associating said voice data with at least one of said data items.

16. The method of claim 15 wherein said presenting is said address book.

17. The method of claim 15 wherein said presenting is said date book.

18. The method of claim 15 wherein said presenting is said memo pad.

19. The method of claim 15 wherein said presenting is said to-do list.

20. The method of claim 15 wherein said presenting is said contact manager.

21. The method of claim 15 wherein said presenting is at least one of said project manager, said expense tracker, and said e-mail client.

22. The method of claim 15 wherein said receiving said voice data is using a microphone.

23. The method of claim 15 wherein said receiving said voice data is integral with said device.

24. The method of claim 15 further comprising:
   (a) receiving at a host computer system said voice data; and
   (b) converting said voice data to a textual representation by said host computer system.

25. The method of claim 24, further comprising said device receiving said textual representation and associating said textual representation with said at least one of said date items on said device.

26. The method of claim 25 wherein said associating said textual representation deletes said voice data.

27. The method of claim 24 wherein said converting includes voice recognition software.

28. The method of claim 24 wherein said converting includes a keyboard.

* * * * *

UNITED STATES PATENT AND TRADEMARK OFFICE
CERTIFICATE OF CORRECTION

PATENT NO. : 6,178,403 B1
DATED : January 23, 2001
INVENTOR(S) : Michael J. Detlef Page 1 of 1

It is certified that error appears in the above-identified patent and that said Letters Patent is hereby corrected as shown below:

Column 2,
Line 19, change "held-held" to -- hand-held --

Column 5,
Line 32, change "receiving vice data" to -- receiving voice data --
Line 34, change "receiving vice data" to -- receiving voice data --

Column 6,
Line 26, change "date items" to -- data items --

Signed and Sealed this

Twenty-third Day of April, 2002

*Attest:*

JAMES E. ROGAN
*Attesting Officer*           *Director of the United States Patent and Trademark Office*